United States Patent
Liu et al.

(10) Patent No.: US 11,580,458 B2
(45) Date of Patent: Feb. 14, 2023

(54) METHOD AND SYSTEM FOR PERFORMANCE TUNING AND PERFORMANCE TUNING DEVICE

(71) Applicant: Fulian Precision Electronics (Tianjin) Co., LTD., Tianjin (CN)

(72) Inventors: Cheng-Yueh Liu, New Taipei (TW); Yi-Hong Lyu, New Taipei (TW)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 388 days.

(21) Appl. No.: 16/908,976

(22) Filed: Jun. 23, 2020

(65) Prior Publication Data
US 2021/0398013 A1 Dec. 23, 2021

(30) Foreign Application Priority Data

Jun. 19, 2020 (CN) .......................... 202010569033.3

(51) Int. Cl.
*G06F 3/00* (2006.01)
*G06N 20/00* (2019.01)
*G06F 16/22* (2019.01)
*G06F 9/50* (2006.01)

(52) U.S. Cl.
CPC ............... *G06N 20/00* (2019.01); *G06F 9/50* (2013.01); *G06F 16/22* (2019.01)

(58) Field of Classification Search
CPC ..................................... G06F 9/54; G06F 9/50
See application file for complete search history.

(56) References Cited

U.S. PATENT DOCUMENTS

| | | | |
|---|---|---|---|
| 11,429,762 B2* | 8/2022 | Mallya Kasaragod | G06N 20/00 |
| 2018/0352394 A1* | 12/2018 | Li | G06F 9/541 |
| 2019/0065284 A1* | 2/2019 | Sardino | G06F 9/5027 |
| 2019/0324727 A1* | 10/2019 | Carranza | G06F 11/3604 |
| 2020/0394318 A1* | 12/2020 | Bahrami | G06N 3/08 |

FOREIGN PATENT DOCUMENTS

| | | | | |
|---|---|---|---|---|
| CN | 107980162 A | * | 5/2018 | ............. G16B 20/00 |
| CN | 110443352 A | | 11/2019 | |
| CN | 110942086 A | | 3/2020 | |
| EP | 3514745 A1 | * | 7/2019 | ........... G06F 16/285 |

OTHER PUBLICATIONS

A. Thomas, A Design Study of a Shared Resource Computing System (Year: 1976).*
Steve Chien, Efficiently Ranking Hypothews in Machine Learning. (Year: 1997).*

* cited by examiner

*Primary Examiner* — Lechi Truong
(74) *Attorney, Agent, or Firm* — ScienBiziP, P.C.

(57) ABSTRACT

A method for performance tuning in Automated Machine Learning (Auto ML) includes obtaining preset application program interface and system resources of the automatic machine learning system. Performance index measurement values are obtained according to the preset application program interface when the system pre-trains deep learning training model candidates. A distribution strategy and a resource allocation strategy are determined according to the performance index measurement values and the system resources and computing resources of the system are allocated according to the distribution strategy and the resource allocation strategy. The disclosure also provides an electronic device and a non-transitory storage medium.

17 Claims, 6 Drawing Sheets

METHOD AND SYSTEM FOR PERFORMANCE TUNING AND PERFORMANCE TUNING DEVICE

FIELD

The subject matter herein generally relates to a performance tuning and a storage medium.

BACKGROUND

The automization in Automated Machine Learning (Auto ML) is automation through feature engineering, model building, and hyperparameter optimization. Auto ML can be divided into two categories. When the supported model category is classification or regression, the techniques used include probability matrix decomposition and Bayesian optimization, which require less computation and therefore lower implementation costs. The other supported model categories are Convolutional Neural Network (CNN), Recurrent Neural Network (RNN), and Long-Short-Term Memory Network (LSTM). The technologies used include learning reinforcement with gradient strategy updates and efficient neural architecture, which uses an RNN controller trained through loops to sample the candidate architecture (i.e., submodel), the candidate architecture then being trained to measure its performance in the desired task. When using AutoML for deep learning, the process of developing a neural network requires significant computing power, and the computing resources requested for each randomly selected candidate architecture are different. Herein, excessive or insufficient allocation of computing resources can be problematic.

Therefore, improvement is desired.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In order to facilitate understanding of the embodiments of the present disclosure, the following definitions are presented.

In the process of developing neural networks, automated machine learning (Auto ML) uploads a training set or sets and search for the best neural network architecture (neural architecture search via parameter sharing, or NAS). The workflow of NAS usually starts from defining a set of "building modules" that may be used by a neural network, such building modules include multiple convolution and pooling modules, and a recurrent neural network (RNN) is then used as controller.

The controller makes selections from these "building modules", and puts them together to form a new neural network architecture. The training set is used to train the new neural network architecture until it converges, and the test set is used to get an accuracy rate. The accuracy rate will then be used to update the controller through the strategy gradient, such that the controller generates higher and higher levels of neural network architecture. The method for developing the structure of convolutional neural networks also includes efficient neural architecture search via parameter sharing (ENAS), and progressive neural architecture search (PNAS).

Figure 1:
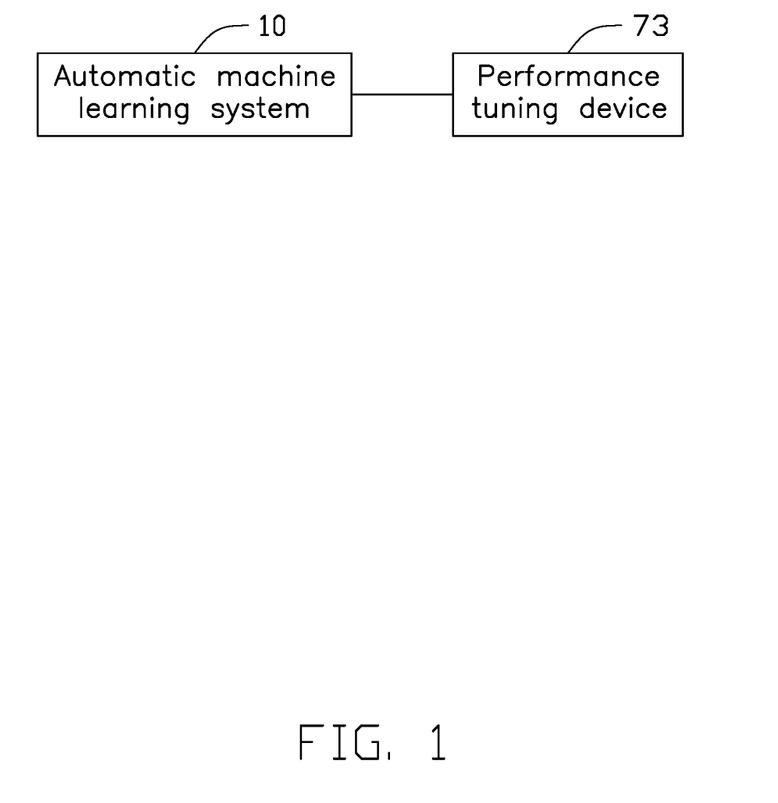
FIG. 1 is a schematic diagram of an embodiment of an automatic machine learning system and a performance tuning device.

FIG. 1 illustrates a performance tuning device 73 in accordance with an embodiment of the present disclosure.

In order to optimize the performance of an automatic machine learning system 10 and reduce the training time of the automatic machine learning system 10, the performance tuning device 73 is integrated with the automatic machine learning system 10. The performance tuning device 73 automatically optimizes the automatic machine learning performance of the automatic machine learning system 10, and allocates computing resources to each deep learning training model candidate randomly selected by the automatic machine learning system 10, to avoid an imbalance in computing resource allocation for each candidate.

In the embodiment, an AutoML bottom layer of the automatic machine learning system 10 can use Scikit-Learn, XGBoost, TensorFlow, Keras, LightGBM, and other tools to ensure efficient runtime.

Figure 2:
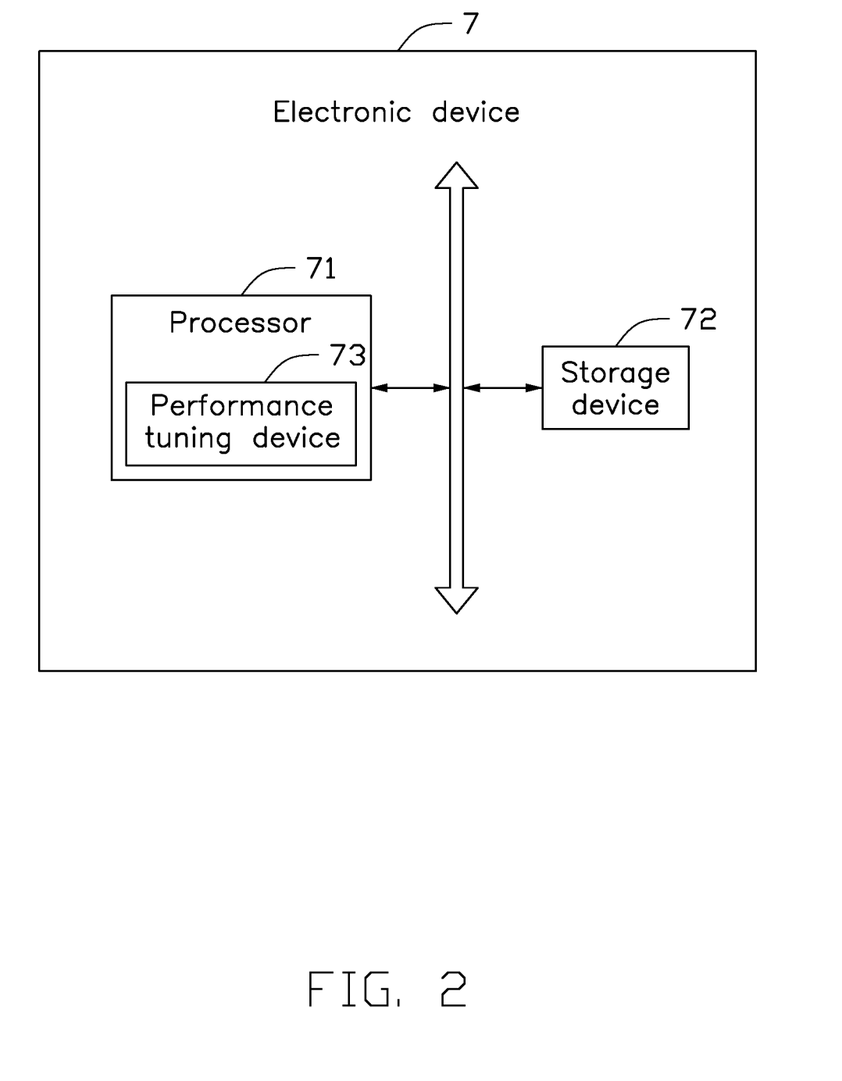
FIG. 2 is a block diagram of an embodiment of an electronic device of the present disclosure.

FIG. 2 illustrates the performance tuning device 73 running in an electronic device 7. The electronic device 7 includes, but is not limited to, a processor 71 and a storage device 72. The performance tuning device 73 runs on the processor 71. When the performance tuning device 73 is executing its program, the steps in the method for performance tuning in the Auto ML learning system. The performance tuning device 73 implements the functions of each unit in the performance tuning device 73 when the computer program is executed.

In the embodiment, the electronic device 7 can include a server (not shown) and the performance tuning device 73. In another embodiment, the electronic device 7 can be a computing device such as a cloud server.

The schematic diagram shown in FIG. 2 is only an example of the electronic device 7, and does not constitute a limitation on the electronic device 7. For example, the electronic device 7 may further include an input and output device, a network access device, and a bus. The performance tuning method is applied to one or more electronic devices.

The electronic device 7 is a device that can automatically perform numerical calculation and/or information processing according to a preset or stored instruction, and its hardware includes but is not limited to a microprocessor and an application specific integrated circuit (ASIC), or Programmable Gate Array (Field-Programmable Gate Array, FPGA), or digital processor (Digital Signal Processor, DSP), or one or more embedded devices.

The electronic device 7 may be a computing device such as a desktop computer, a notebook computer, a tablet computer, and a cloud server. The electronic device 7 can interact with a user through keyboard, mouse, remote control, touchpad, or voice control device.

Figure 3:
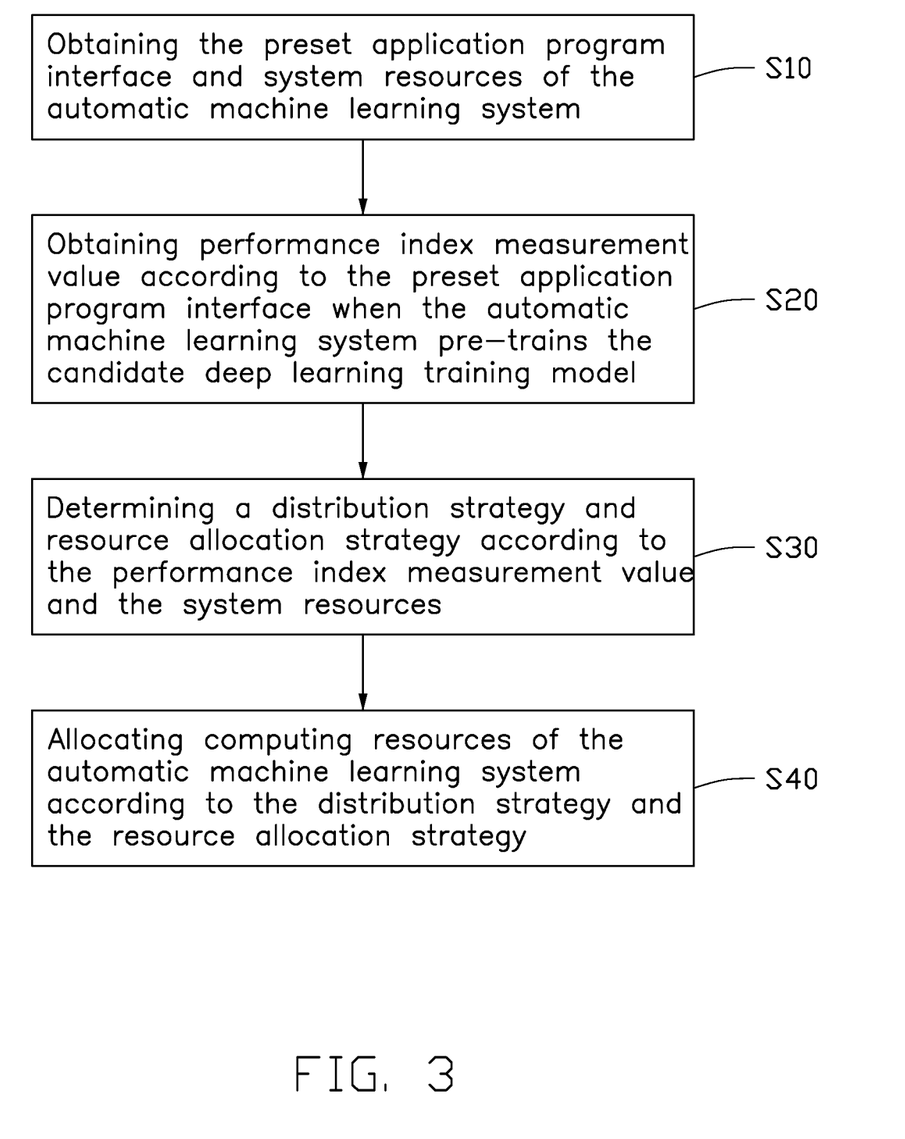
FIG. 3 is a flowchart of an embodiment of a performance tuning method.

FIG. 3 illustrates a flowchart of a method for performance tuning, the method may include the following steps.

In block S10, obtaining the preset application program interface and system resources of the automatic machine learning system 10.

In the embodiment, the performance tuning device 73 is coupled to the automatic machine learning system 10, and the computing backend of the automatic machine learning system 10 is a computing backend recognized by the performance tuning device 73, such as TensorFlow. The performance tuning device 73 can obtain information as data of the automatic machine learning system 10, and obtain preset application program interfaces and system resources of automatic machine learning system 10.

In the embodiment, the performance tuning device 73 may include a tuning server and a performance analysis tool.

Figure 4:
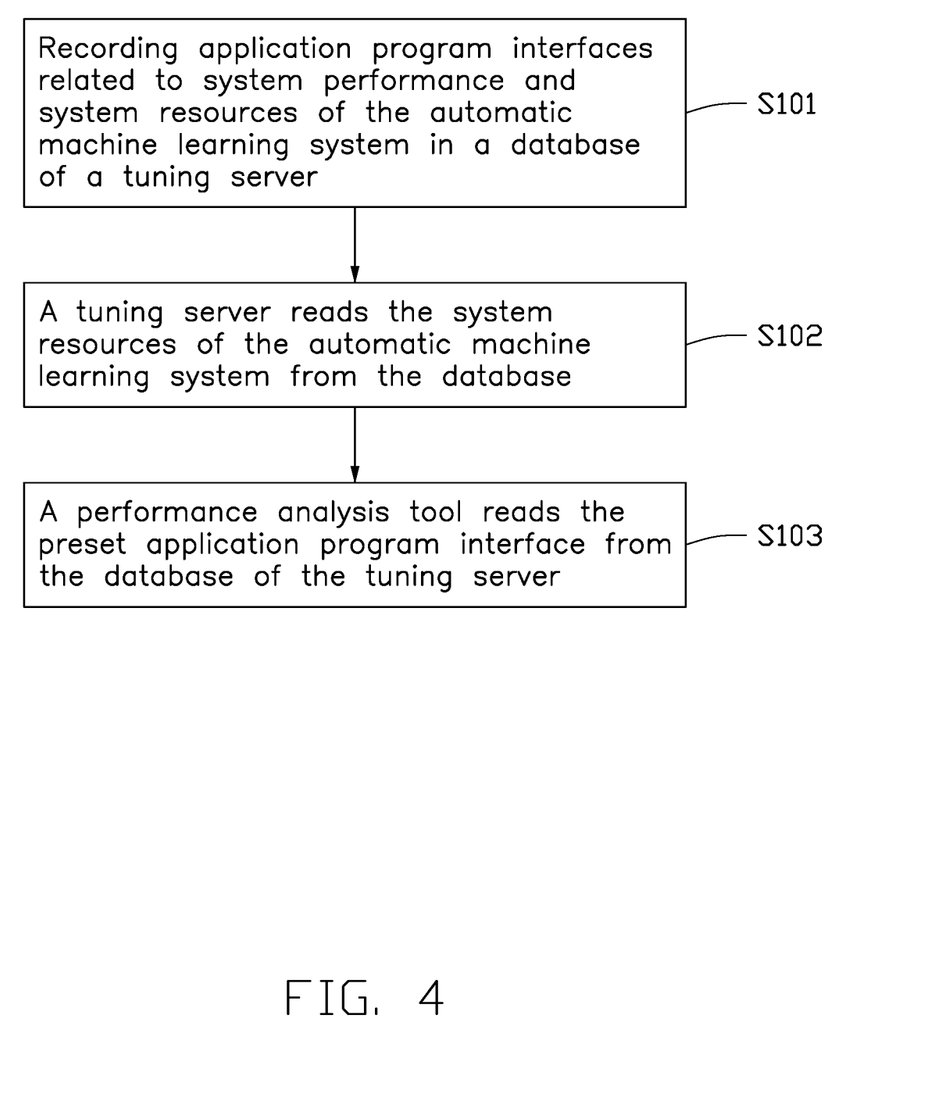
FIG. 4 is a flowchart of another embodiment of a performance tuning method.

Referring to FIG. 4, the obtaining of the preset application program interface and system resources of the automatic machine learning system may be by the following steps:

In block S101, recording application program interfaces related to system performance in the automatic machine learning system 10 and system resources in a database of a tuning server.

In block S102, a tuning server reads the system resources of the automatic machine learning system from the database.

In block S103, a performance analysis tool reads the preset application program interface from the database of the tuning server.

In the embodiment, the tuning server and the performance analysis tool can identify the computing backend of the automatic machine learning system 10, and the tuning server records in advance in the database its performance-related application program interface and available system resources of the automatic machine learning system 10. The preset application program interface is an application program interface related to performance in the deep machine learning stack of the automatic machine learning system 10.

In the embodiment, the tuning server may be a built-in POTAO server that generates the distribution strategy and resource configuration strategy.

In the embodiment, the performance analysis tool may be a SOFA server with a built-in performance measurement tool, and may also include a flame graph with a built-in performance measurement tool. The performance analysis tool can collect heterogeneous performance index measurements from the central processing unit (CPU), graphics processing unit (GPU), communication network, and storage devices.

In block S20, obtaining performance index measurement values according to the preset application program interface when the automatic machine learning system pre-trains the deep learning training model candidate.

In the embodiment, after the user inputs the training data to the automatic machine learning system 10, the system 10 performs a neural network search, pre-trains the deep learning training model candidate which is found, and obtains the performance index measurement values according to the preset application program interface during the learning and training process.

When the automatic machine learning system 10 pre-trains a deep learning training model candidate, the performance analysis tool obtains the performance index measurement values of the application program interface according to the preset application program interface, for example, by means of gRPC Remote Procedure Calls, to transmit the performance index measurement values to the tuning server. In the embodiment, the performance analysis tool is integrated with the automatic machine learning system 10.

In the embodiment, the performance analysis tool is integrated and packaged with the automatic machine learning system 10, and the performance analysis tool, the automatic machine learning model and the corresponding application program interface software package are integrated together to realize automatic acquisition of the performance index measurement values of the automatic machine learning system 10. The performance index measurement values are sent to the POTAO server through remote call, such that the POTAO server can make decisions as to calculating resources.

AutoKeras is selected as the engine of the automatic machine learning system 10. The AutoKeras will use an effective neural architecture search algorithm (ENAS) to select the deep learning model candidate and evaluate it, and select a next best candidate according to the previous evaluation of deep learning model candidate.

The user inputs the training data to the AutoKeras, and the data preprocessing API of the AutoKeras determines the size of the data for one training according to the hyperparameter batch size of the deep neural network. During the training process, the SOFA server obtains the performance index measurement values of the preset application program interface of the AutoKeras through the performance measurement tool.

For example, the measurement values of the number of data exchanges on the expansion bus standard bus (PCIe BUS) of a high-speed serial computer can be obtained through an efficiency measurement tool. The SOFA server sends the obtained performance index measurement values to the POTAO server through gRPC Remote Procedure Calls for example, and the POTAO server allocates computing resources to the candidate according to the performance index measurements values and the system resources.

The performance index can include forward and backward propagation times, time for copying data from host to GPU device, time for copying data from GPU device to host (D2H) or from peer-to-peer (P2P).

The performance index can include user space and system space program running time, file system, or storage media read and write bandwidth, network use bandwidth, call hot spot distribution, and time-consuming locks in the system.

In block S30, determining a distribution strategy and resource allocation strategy according to the performance index measurement value and the system resources.

In the embodiment, the performance analysis tool sends the performance index measurement value to the POTAO server through the remote procedure call, and the POTAO server determines a distribution strategy and resource allocation strategy according to the performance index measurement values and the system resources.

The POTAO server creates another YAML Ain't Markup Language (YAML) file to generate Kubernetes pods, the Pod being the smallest unit that can be created and deployed in Kubernetes, that is, an application in Kubernetes cluster examples. Kubernetes manages containerized applications on multiple hosts in a cloud platform, an open source platform that automates container operations. The YAML file will record the specific application container engine images to be run, the allocation of hardware resources, and the settings of the virtual machine nodes of the corresponding containers.

The determining of the distribution strategy based on the measured values of the performance index and the system resources is achieved by the following steps:

The performance tuning device 73 determines single-node training or multi-node training according to the performance index measurement values and the system resources. The single-node training includes training the deep learning training model candidate by a single node, and the multi-node training includes multiple nodes jointly training the deep learning training model candidate, and sharing the parameter variables in the deep learning training model candidate.

In the embodiment, training task of the candidate determines whether to train by a single node or by multiple nodes according to the performance index measurement value and the system resources. When the training task is heavy, the distributed training distribution among multiple nodes allows the deep learning training task to be expanded, and a larger model can be learned or trained at a faster speed. When the training task is light, training through a single node can ensure the reasonable allocation of computing resources and avoid excessive or repeated allocations of computing resources.

In the embodiment, the single node training includes training the candidate by a single device or multiple mirror devices in a single node. The multi-node training includes training the candidate by multiple nodes using a replication mode or a parameter server mode.

In the embodiment, when the training is performed by a single node, the training can be performed by a single device, for example, a single graphics processor, the graphics processor or the central processor storing the parameters. The candidate may also be trained by multiple mirroring devices, for example, the graphics processor of multiple mirroring devices training the candidate, and then the graphics processor storing the parameters.

In the embodiment, joint training is performed on multiple nodes, and multiple programs are simultaneously trained to jointly train the candidate, the parameter variables of the candidate, such as weights and offset values, being shared. When using replication mode, multiple graphics processors on multiple nodes are trained, and the graphics processor stores the parameters. When the parameter server mode is used, the parameters of the candidate and the training data are stored separately based on the parameter server, the graphics processor performing the training, and the central processor storing the parameters.

When using TensorFlow's application program interface for deep learning distributed training, if the number of high-speed serial computer expansion bus standard bus data exchanges obtained by the SOFA server is small, the POTATO server recommends the parameter server mode, such as Parameter Server, to support distributed storage and collaboration of large-scale parameters. If the number is higher, a replication mode such as mirror replication is adopted, and the mirror file is transferred in a regional data center to target regional data center through the network.

In the embodiment, the performance tuning device 73 configures the application program interface, software resources, and hardware resources for the deep learning training model candidate according to the performance index measurement values and the system resources.

In the embodiment, the POTAO server determines the application program interface, matching software resources and hardware resources used by the candidate currently selected by the automatic machine learning system 10.

Figure 5:
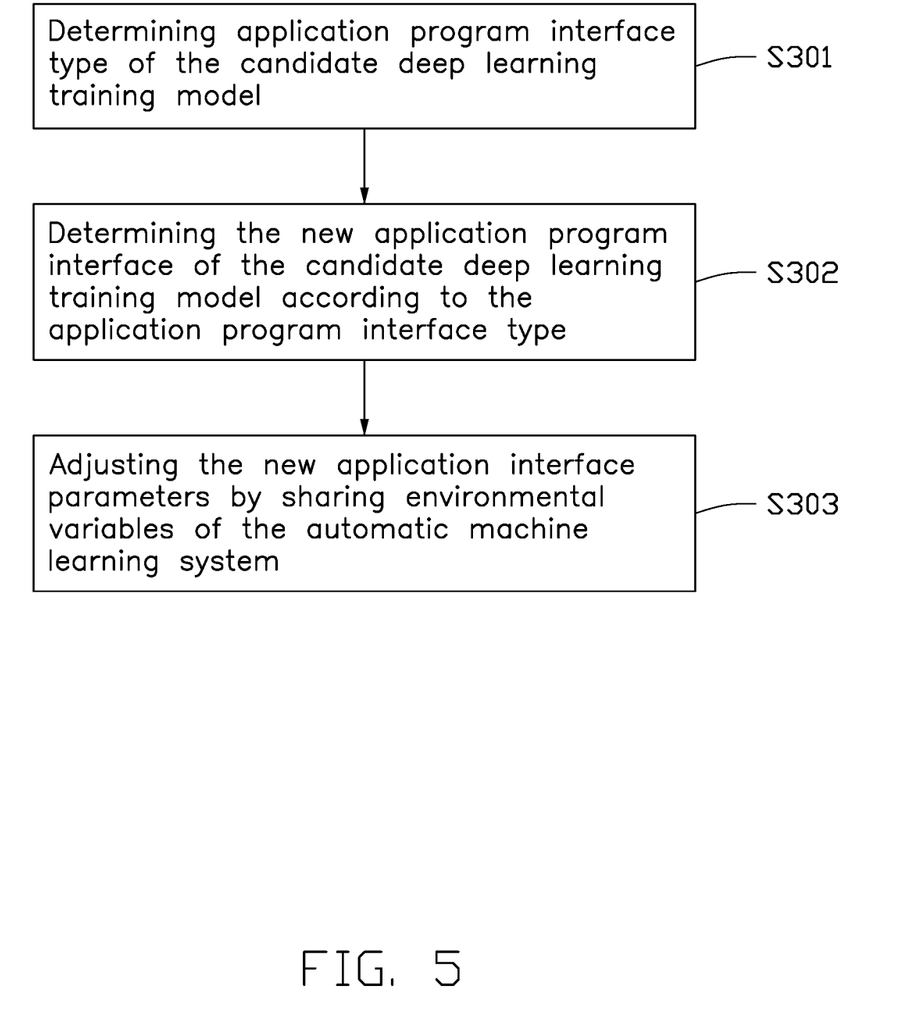
FIG. 5 is a flowchart of another embodiment of a performance tuning method.

In another embodiment, referring to FIG. 5, the performance tuning device 73 configuring the application program interface for the candidate according to the performance index measurement values and the system resources is performed by the following specific steps:

In block S301, determining application program interface type of the deep learning training model candidate.

In the embodiment, the performance tuning device 73 determines the type of application program interface required by the candidate.

In block S302, determining the new application program interface of the candidate according to the type of application program interface.

In the embodiment, the performance tuning device 73 allocates a new application program interface to the candidate according to the newly determined application program interface type.

In block S303, adjusting the new application interface parameters by sharing environmental variables of the automatic machine learning system.

In the embodiment, the parameters can include batch size.

In the embodiment, the POTAO server adjusts the new application program interface by sharing the environment variables of the automatic machine learning system 10, and re-executing the new application program interface.

In the embodiment, the performance tuning device 73 can determine the maximum value of the batch processing of the deep learning model that can be afforded according to the computing power of the GPU and its memory size, and set such model in the new application program interface to restart the application program interface, the data size of one training of the candidate can be adjusted.

In the embodiment, the performance tuning device 73 may use remote call GRPC to share the same candidate among all connected computing nodes to perform batch data parallel calculation.

In block S40, allocating computing resources of the automatic machine learning system according to the distribution strategy and the resource allocation strategy, such that the candidate is trained based on the allocation of computing resources.

The candidate is trained based on the allocation of computing resources, the automatic machine learning system 10 evaluates the performance of the candidate, and then continues selecting new candidates for training based on the model evaluation results. The system 10 can cycle from block S10 to block S40 and back again to allocate computing resources for the new candidate until a candidate that meets the requirements is obtained.

In the embodiment, the POTAO server sends the determined distribution strategy and the resource allocation strategy to the automatic machine learning system 10, and allocates the computing resources of the automatic machine learning system 10 based on the distribution strategy and the resource allocation strategy. Thereby, the automatic machine learning system 10 allocates computing resources to the currently selected candidate according to the allocated computing resources, such as allocating the number of CPU cores, main memory capacity, and number of GPUs. The candidate is trained based on the allocation of computing resources.

The automatic machine learning system 10 tries out the new candidate in each round, and then dynamically optimizes the performance according to the characteristics of each newly selected candidate through the performance tuning method.

After optimization of the automatic machine learning system 10 is completed, an automatic machine learning application program interface is generated, test data is input to the application program interface, and the test data is tested.

Figure 6:
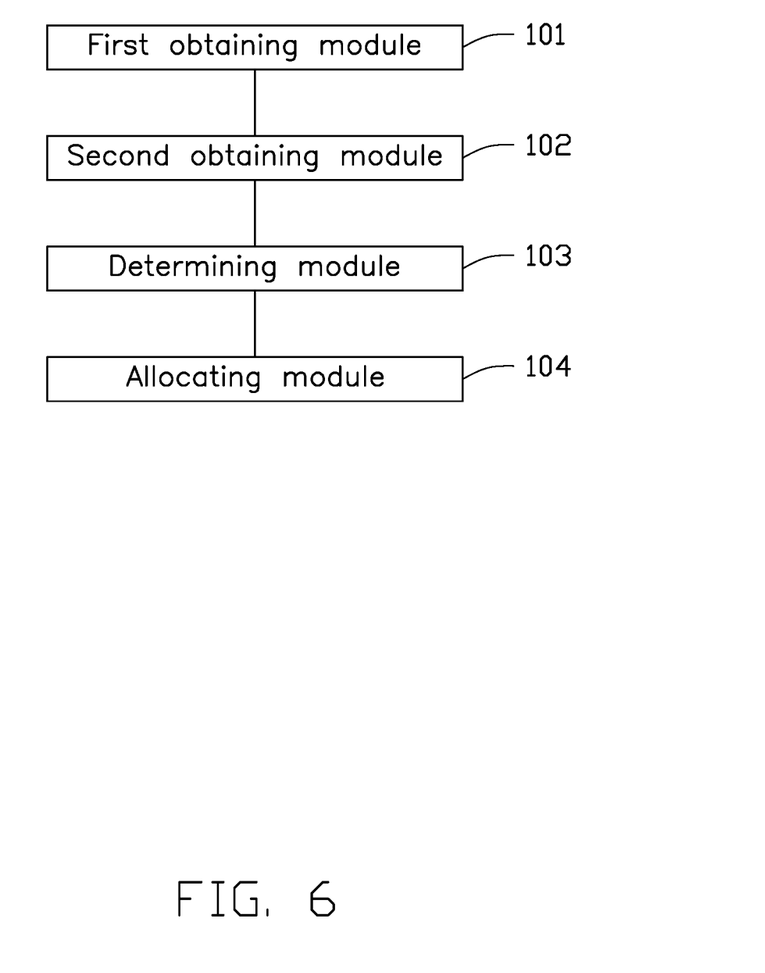
FIG. 6 is a block diagram of an embodiment of the performance tuning device.

Referring to FIG. 6, in at least one embodiment, the performance tuning device 73 may be divided into one or more modules, the one or more modules are stored in the storage device 72 and executed by the processor 71. The one or more modules may be a series of computer program instruction segments capable of performing specific functions, and the instruction segments are for the execution process of the performance tuning device 73 in the electronic device 7. For example, the performance tuning device 73 may be divided into a first obtaining module 101, a second obtaining module 102, a determining module 103, and an allocating module 104, as shown in FIG. 6.

In at least one embodiment, the first obtaining module 101 obtains the preset application program interface and system resources of the automatic machine learning system.

In at least one embodiment, the first obtaining module 102 obtains the performance index measurement values according to the preset application program interface when the automatic machine learning system pre-trains the deep learning training model candidate.

In at least one embodiment, the determining module 103 can determine the distribution strategy and the resource allocation strategy according to the performance index measurement values and the system resources.

In at least one embodiment, the allocating module 104 can allocate the computing resources of the automatic machine learning system according to the distribution strategy and the resource allocation strategy.

In at least one embodiment, the processor 71 can be a central processing unit (CPU), or can be other general-purpose processor, digital signal processor (DSPs), application specific integrated circuit (ASIC), Field-Programmable Gate Array (FPGA), or other programmable logic device, discrete gate, or transistor logic device, or discrete hardware component.

The processor 71 can be a microprocessor, or the processor 71 can be any conventional processor. The processor 71 is the control center of the electronic device 7 and uses various interfaces and lines to connect the various parts of the electronic device 7.

In another embodiment, one or more modules may also be stored in the storage device 72, and executed by the processor 71. The storage device 72 may be the internal memory of the electronic device 7. In other embodiments, the storage device 72 may also be an external memory of the electronic device 7, that is, the storage device 72 being attached to the electronic device 7.

In some embodiments, the storage device 72 is used to store program code and data, for example, the storage can store the program code of the performance tuning device 73 installed in the electronic device 7.

In one embodiment, the storage device 72 may include random access memory, as well as non-volatile memory, such as hard drives, memory, plug-in hard drives, smart media card, secure digital, SD card, Flash Card, at least one disk memory, and flash device.

When the modules/units integrated in the performance tuning device 73 are implemented in the form of software functional units of independent or standalone products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the embodiments of the foregoing method or methods. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, a recording medium, a U disk, a mobile hard disk, a magnetic disk, an optical disk, a computer memory, or a read-only memory (ROM).

The division of modules described above is a logical function division, the actual implementation of division can be in some other way. In addition, each function module in each embodiment of this application may be integrated into the same processing unit, or the individual modules may be physically present, or two or more modules may be integrated in the same cell.

The above integrated module can be implemented in the form of hardware, or in the form of hardware plus software function module.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

The invention claimed is:

1. A performance tuning method comprising:
obtaining preset application program interface and system resources of an automatic machine learning system;
obtaining performance index measurement value according to the preset application program interface when the automatic machine learning system pre-trains deep learning training model candidate;
determining a distribution strategy and a resource allocation strategy according to the performance index measurement value and the system resources; and allocating computing resources of the automatic machine learning system according to the distribution strategy and the resource allocation strategy;

configuring the application program interface, software resources, and hardware resources for the deep learning training model candidate according to the performance index measurement value and the system resources;

determining application program interface type of the deep learning training model candidate; and determining new application program interface of the deep learning training model candidate according to the application program interface type.

2. The performance tuning method according to claim 1, further comprising:

determining single-node training or multi-node training according to the performance index measurement value and the system resources;

wherein the single-node training comprises a single node trains the deep learning training model candidate, and the multi-node training comprises multiple nodes jointly train the deep learning training model candidate, and share parameter variables in the deep learning training model candidate.

3. The performance tuning method according to claim 2, wherein the single-node training comprises a single device or multiple mirror devices in a single node trains the deep learning training model candidate, and the multi-node training comprises the multiple nodes using a replication mode or a parameter server mode to train the deep learning training model candidate.

4. The performance tuning method according to claim 1, further comprising:

adjusting parameters of the new application interface by sharing environmental variables of the automatic machine learning system.

5. The performance tuning method according to claim 4, further comprising:

recording the application program interface related to system performance and system resources of the automatic machine learning system in a database of a tuning server;

wherein the tuning server reads the system resources of the automatic machine learning system from the database;

wherein a performance analysis tool reads the preset application program interface from the database of the tuning server.

6. The performance tuning method according to claim 5, wherein when the automatic machine learning system pre-trains the deep learning training model candidate, the performance analysis tool obtains the performance index measurement value of the application program interface according to the preset application program interface, and transmits the performance index measurement value to the tuning server, the performance analysis tool is integrated with the automatic machine learning system.

7. An electronic device comprising:

a storage device; and a processor;

wherein the storage device stores one or more programs, which when executed by the processor, cause the processor to:

obtain preset application program interface and system resources of an automatic machine learning system;

obtain performance index measurement value according to the preset application program interface when the automatic machine learning system pre-trains deep learning training model candidate;

determine a distribution strategy and a resource allocation strategy according to the performance index measurement value and the system resources; and allocate computing resources of the automatic machine learning system according to the distribution strategy and the resource allocation strategy;

configure the application program interface, software resources, and hardware resources for the deep learning training model candidate according to the performance index measurement value and the system resources;

determine application program interface type of the deep learning training model candidate;

determine new application program interface of the deep learning training model candidate according to the application program interface type.

8. The electronic device according to claim 7, wherein the processor is further caused to:

determine single-node training or multi-node training according to the performance index measurement value and the system resources;

wherein the single-node training comprises a single node trains the deep learning training model candidate, and the multi-node training comprises multiple nodes jointly train the deep learning training model candidate, and share parameter variables in the deep learning training model candidate.

9. The electronic device according to claim 8, wherein the single-node training comprises a single device or multiple mirror devices in a single node trains the deep learning training model candidate, and the multi-node training comprises the multiple nodes using a replication mode or a parameter server mode to train the deep learning training model candidate.

10. The electronic device according to claim 7, further causing the at least one processor to:

adjust parameters of the new application interface by sharing environmental variables of the automatic machine learning system.

11. The electronic device according to claim 10, wherein the processor is further caused to:

record the application program interface related to system performance and system resources of the automatic machine learning system in a database of a tuning server;

wherein the tuning server reads the system resources of the automatic machine learning system from the database;

wherein a performance analysis tool reads the preset application program interface from the database of the tuning server.

12. The electronic device according to claim 11, wherein when the automatic machine learning system pre-trains the deep learning training model candidate, the performance analysis tool obtains the performance index measurement value of the application program interface according to the preset application program interface, and transmits the performance index measurement value to the tuning server, the performance analysis tool is integrated with the automatic machine learning system.

13. A non-transitory storage medium having stored thereon instructions that, when executed by a processor of an electronic device, causes the processor to perform a performance tuning method, the method comprising:

obtaining preset application program interface and system resources of an automatic machine learning system;

obtaining performance index measurement value according to the preset application program interface when the automatic machine learning system pre-trains deep learning training model candidate;

determining a distribution strategy and a resource allocation strategy according to the performance index measurement value and the system resources; and allocating computing resources of the automatic machine learning system according to the distribution strategy and the resource allocation strategy;

configuring the application program interface, software resources, and hardware resources for the deep learning training model candidate according to the performance index measurement value and the system resources;

determining application program interface type of the deep learning training model candidate;

determining new application program interface of the deep learning training model candidate according to the application program interface type.

14. The non-transitory storage medium according to claim 13, further comprising:

determining single-node training or multi-node training according to the performance index measurement value and the system resources;

wherein the single-node training comprises a single node trains the deep learning training model candidate, and the multi-node training comprises multiple nodes jointly train the deep learning training model candidate, and share parameter variables in the deep learning training model candidate.

15. The non-transitory storage medium according to claim 14, wherein the single-node training comprises a single device or multiple mirror devices in a single node trains the deep learning training model candidate, and the multi-node training comprises the multiple nodes using a replication mode or a parameter server mode to train the deep learning training model candidate.

16. The non-transitory storage medium according to claim 13, further comprising:

adjusting parameters of the new application interface by sharing environmental variables of the automatic machine learning system.

17. The non-transitory storage medium according to claim 16, further comprising:

recording the application program interface related to system performance and system resources of the automatic machine learning system in a database of a tuning server;

wherein the tuning server reads the system resources of the automatic machine learning system from the database;

wherein a performance analysis tool reads the preset application program interface from the database of the tuning server.

* * * * *